(12) United States Patent
Kleinmann

(10) Patent No.: US 8,007,844 B2
(45) Date of Patent: Aug. 30, 2011

(54) PROCESS FOR PRODUCING A CHEESE WITH A NATURAL MOLDY RIND

(75) Inventor: Viktor Kleinmann, Montigne les Rairies (FR)

(73) Assignee: Bongrain S.A., Viroflay (FR)

( * ) Notice: Subject to any disclaimer, the term of this patent is extended or adjusted under 35 U.S.C. 154(b) by 1251 days.

(21) Appl. No.: 11/438,261

(22) Filed: May 23, 2006

(65) Prior Publication Data

US 2007/0003665 A1    Jan. 4, 2007

(30) Foreign Application Priority Data

May 24, 2005   (EP) .................................... 05291109

(51) Int. Cl.
*A23C 9/12*   (2006.01)
(52) U.S. Cl. ............. 426/36; 426/34; 426/520; 426/582
(58) Field of Classification Search ................... 426/34, 426/36, 37, 38, 42, 43, 130, 518, 520, 580, 426/582
See application file for complete search history.

(56) References Cited

U.S. PATENT DOCUMENTS

| 4,627,984 | A | * | 12/1986 | Authelet et al. | ................ | 426/37 |
| 4,824,682 | A | * | 4/1989 | Morrison | ........................... | 426/8 |
| 5,702,738 | A | * | 12/1997 | Phillips | ........................... | 426/36 |
| 7,041,323 | B2 | * | 5/2006 | Andersen | ....................... | 426/38 |

FOREIGN PATENT DOCUMENTS

| EP | 0 148 079 | 7/1985 |
| EP | 1 041 010 | 10/2000 |
| WO | 91/14374 | 10/1991 |

OTHER PUBLICATIONS

European Search Report.

* cited by examiner

*Primary Examiner* — Leslie Wong
(74) *Attorney, Agent, or Firm* — William E. Beaumont

(57) ABSTRACT

Process for producing a soft cheese with a natural moldy rind, the starting material being a milk, this process comprising the steps of preparing a cheese slurry, inoculation with microorganisms, ripening, heat treatment by immersing in an atmosphere saturated with steam or in a water bath. This process makes it possible to obtain a cheese which may be packaged and preserved in the form of slices.

26 Claims, No Drawings

PROCESS FOR PRODUCING A CHEESE WITH A NATURAL MOLDY RIND

RELATED APPLICATIONS

The present application is based on, and claims priority from, European Patent Application Number 05291109.6, filed May, 24, 2005, the disclosure of which is hereby incorporated by reference herein in its entirety.

The subject of the present invention is a novel process for producing a soft cheese with a natural moldy rind, this process making it possible to obtain a cheese which may be packaged and preserved in the form of slices.

Conventional processes for producing soft cheeses with a natural moldy rind generally comprise the following steps:

(a) addition of rennet to the milk which leads to the formation of a curd which is sliced, drained, molded, acidified, salted;

(b) the molded cheese is inoculated with molds such as *Penicillium candidum*, which produces a surface mold;

(c) development of the surface mold for 7 to 12 days.

A cheese obtained by this conventional process can be preserved for about 45 days at a temperature of 4 to 6° C. If such a cheese is sliced and placed in a hermetically sealed packaging in the absence of oxygen, molds such as *Penicillium candidum* and its enzymes develop a nauseating, rancid, ammonia or lipolyzed flavor.

If such a cheese is sliced and stored in an oxygen-permeable packaging, the *P. candidum* and/or contaminating molds develop on the slice.

Several solutions have been proposed in order to improve the preservation of soft cheeses with a natural moldy rind:

In some cheeses that are marketed in the form of slices, the rind formed by *Penicillium candidum* is replaced by a rind based on titanium oxide which is inert and which is therefore not degraded under the storage conditions. The disadvantage of this process is that the coloration of the cheese is uniform, artificial and the cheese does not possess a ripening flavor.

It is also possible to subject the cheese to sterilization at the end of step (c). However, the sterilization of soft cheeses with a moldy rind leads to products whose flavor is weakened and whose texture is modified compared with the original cheese.

The document EP-0 148 079 describes a process for improving the storage life of soft cheeses, this process consisting in placing the cheese in a packaging comprising an inner layer made of nonwoven fibers absorbing moisture and an impervious outer layer. The whole is pasteurized at 100° C. for 50 minutes. This process has the disadvantage of significantly reducing the organoleptic qualities of the cheese thus treated.

The document WO 91/14374 describes a process for producing a soft cheese with a moldy rind having an extended shelf life. The problem which the authors of this document seek to solve is the degradation of camembert type cheeses after 6 to 10 weeks. The solution is the use of a fromage frais which is inoculated at the surface and an incubation under controlled conditions.

Unlike the invention in reference, this document relates solely to the problem of the degradation of the inner part of the cheese and not of the rind.

The document EP-1 184 298 describes a process for packaging cheeses with a moldy rind. The aim pursued by the authors is the improvement of the preservation of these cheeses, the obtaining of optimum gaseous concentrations for the development of the surface flora. The solution proposed is a hermetically sealed chamber comprising a material with selective permeability which makes it possible to maintain around the cheese a controlled $O_2$ and $CO_2$ atmosphere.

Only sterilization currently makes it possible to address the problem of the preservation of sliced cheese, both for the rind part and for the inner part of the slice (body).

The objective which the inventors aim to achieve is the development of a process for preparing a soft cheese with a natural moldy rind, this process allowing the preservation of the cheese in the form of slices under satisfactory conditions, while preserving the natural flavor characteristics of the product, its appearance and its texture.

Such an objective is achieved by means of the process of the invention which comprises the following steps:

The starting product is a milk, (i) from the milk, a cheese slurry is prepared, either by renneting, or by gelling of the milk;

(ii) the molded cheese obtained in step (i) is inoculated with microorganisms, at least one of which is a mold;

(iii) the cheese in step (ii) is ripened;

(iv) the ripened cheese obtained at the end of step (iii) is subjected to a heat treatment by immersing in an atmosphere saturated with steam or in a water bath for 10 seconds to 5 minutes at a temperature of 60 to 100° C.;

Preferably, in step (v) the cheese obtained from step (iv) is dried.

The cheese thus obtained can then be sliced and packaged under a gas in a packaging which acts as a barrier to oxygen. It can then be preserved for 6 to 8 weeks.

The expression cheese with a moldy rind is understood to mean a cheese having at its surface a rind formed by the development of a surface flora due to the presence of at least one mold, optionally in combination with one or more bacterial or yeast strains, this flora contributing to the development of specific organoleptic characteristics and of a felt appearance at the surface of the cheese.

Compared with the process consisting in sterilizing the cheese with a moldy rind, the invention is distinguishable in that a controlled heat treatment, limited to the surface of the product, is carried out. Such a treatment is limited to acting on the surface of the cheese without modifying the texture or the taste of the inner part (body) of the cheese.

The result is the production of a cheese whose taste and texture are identical to those of an untreated cheese, which can be sliced and preserved under a gas in a packaging impervious to oxygen, without the development of nauseating flavors characteristic of the degradation of molds such as *Penicillium candidum* and yeasts such as *Geotricium candidum*.

The milk which is used as starting material may be of any origin, and in particular cow's, goat's, sheep's or buffalo's milk.

The milk may optionally have been enriched with cream.

It may also have been defatted to 0% fat.

Among the cheeses to which the invention applies, there may be mentioned in particular: camembert, brie, coulommiers, pont-l'évêque, saint nectaire.

The steps of the process are set out in greater detail below, steps (i) to (iii) being well known to a person skilled in the art who knows how to adjust the parameters thereof:

The milk may, without this being obligatory, be subjected to a pretreatment such as for example: ultrafiltration (production of a liquid precheese); heat treatment: pasteurization, sterilization; inoculation with *Penicillium candidum*.

Next, in a traditional manner, the milk is subjected to renneting: the addition of rennet to the milk leads to the formation of a curd which is sliced, molded, drained. In a first instance, the rennet is added to the milk heated to a temperature of 32 to 40° C. This addition causes the flocculation of the casein and the curd is obtained which is then subjected to a slicing operation before being molded. In the mold, the curd is drained and takes its final shape.

According to one variant, instead of renneting, the milk is thickened with the aid of one or more gelling agents known for this use: gelatin, guar gum and carrageenan constitute examples of such gelling agents.

After molding the curd, or the gelled cheese slurry, is acidified and then salted by soaking in a brine bath.

The acidification consists in an addition of lactic acid bacteria such as thermophilic streptococci, mesophilic lactococci, lactobacilli or other acidifiers. The acidification is performed such that the pH is between 3 and 5.5, preferably less than or equal to 5.2, more preferably still less than or equal to 5.1.

The microbial inoculation comprises the addition of at least one mold, at the surface, and optionally to the inner part (body) of the cheese, such as for example inoculation with *Penicillium* or *Cylindrocarpon*, in particular *Penicillium candidum, Penicillium camemberti, Penicillium roqueforti, Cylindrocarpon heteronema*. The inoculation may also comprise the addition of one or more yeasts, such as for example yeasts of the *Geotrichum* type.

This step causes the production of the surface mold in a period of 9 to 11 days. Next, the cheese is ripened, this operation consisting in keeping it for a period of 6 to 25 days at a temperature of 7 to 18° C., with a controlled humidity, turning it several times at regular intervals. Preferably, the ripening period is between 8 and 20 days, and more preferably still between 10 and 15 days. Preferably, the relative humidity is 75 to 99% humidity, preferably in the region of 95% humidity.

According to one variant of the invention, the starting cheese is a fromage frais and it is inoculated at the surface with a microorganism, such as *Penicillium candidum* or *Penicillium camemberti* so as to develop a natural moldy rind, while preserving a fromage frais center. Such cheeses are in particular described in WO91/14374. The remainder of the treatment is the same regardless of the mode of preparation of the cheese base.

After this step, the cheese is subjected to a heat treatment by immersing in an atmosphere saturated with steam or in a water bath for 10 seconds to 5 minutes at a temperature of 60 to 100° C. Preferably, the heat treatment consists of a water bath for a period preferably of 40 to 80 seconds and advantageously of about 60 seconds. The water bath may comprise in the bath water a sterilization adjuvant such as, for example, salt, lactic acid, sodium hydroxide or any other compound known to a person skilled in the art for this function. It is also possible to allow for the heat treatment to be a treatment with infrared radiation. Advantageously, the heat treatment is carried out at a temperature ranging from 60 to 100° C., preferably from 85 to 95° C., advantageously of about 90° C. This treatment has the effect of reducing the number of cells capable of forming colonies (or CFU for Colony Forming Units) without releasing degradation enzymes. Thus, it prevents the degradation of the cheese under the storage conditions. On the other hand, the taste, the appearance and the texture of the body remain unchanged.

It is then subjected to drying, preferably at a temperature of −2 to 20° C.; with a humidity of 50 to 90% humidity, for a period of 12 to 48 hours.

The cheese is then sliced and packaged under a gas in a packaging which acts as a barrier to oxygen. The gas used for the packaging is nitrogen, optionally mixed with carbon dioxide, comprising from 0 to 50% of carbon dioxide and 50 to 100% of nitrogen. The slicing may result in flat slices, but the invention also relates to products sliced into portions such as brie triangles for example or camembert triangles.

The packaging may for example consist, in a known manner, of a plastic tub with a top.

Such a product may be stored in the fresh food department (at a temperature of 2 to 6° C.) for a period of 6 to 8 weeks, without nauseating flavors developing.

By virtue of the process of the invention, a drastic reduction is observed in the number of mold spores in the rind. This reduction may be of at least two logarithmic units, preferably 3, or better still 4 logarithmic units.

Compared with the soft cheeses with a moldy rind which has not been subjected to the controlled heat treatment, the cheeses obtained by the process of the invention have the characteristic feature of having in their rind a quantity of spores of molds and in particular of *Penicillium candidum*, measured in logarithmic unit of spores capable of forming colonies, of about 0.75 to 3.5 logarithmic units, preferably 1 to 3 logarithmic units and more preferably still 1.5 to 2.5. In comparison, the rind of a soft cheese with a moldy rind manufactured according to a traditional process contains from 6 to 7 logarithmic units of spores capable of forming colonies. A cheese which has undergone sterilization has a number of spores capable of forming colonies equal to zero.

As regards the body, in the cheeses which have been subjected to the process of the invention, it contains, like traditional cheeses, live lactic ferments, while the cheeses which have undergone sterilization no longer contain live lactic ferments.

Such cheeses are advantageously preserved packaged in the form of slices under a gas in a packaging which acts as a barrier to oxygen.

The cheeses obtained by the process of the invention have characteristics which did not exist in the prior art cheeses; they constitute another subject of the invention.

EXAMPLES

In these examples, the manufacturing conditions are given purely as a guide. They include certain parameters of a know-how specific to the cheese tradition of a region and they can be adapted according to each cheese and the judgment of persons skilled in the art.

Example 1

Slice of Soft Cheese with a Moldy Rind with *Penicillium candidum*

A soft cheese was manufactured in the form of a log with rennet, lactic ferments and *Penicillium candidum* and according to the process below:

1. Brining for a period of about 1 hour, 24 hours after the production of the curd (fromage frais) in order to ensure a sufficient salt level (1-2%) followed by inoculation by spraying *Penicillium candidum*.
2. Ripening in a cheese ripening room at a temperature of 15° C. and a relative humidity of about 90% with regular turning over, either daily or approximately every 3 days.
3. As soon as the cheese is well covered with *Penicillium candidum*, normally between 7 and 14 days after its manufacture, it is immersed in a water bath of hot water at a temperature of about 85° C. for a period of 1 minute and 30 seconds.
4. The product is dried and cooled in a well-ventilated dry atmosphere whose humidity is at about 75% relative humidity and the temperature is between 0 and 4° C.

5. Once the surface of the product is dried and cool, after about 36 hours, the log is cut into slices with a thickness of about 2 mm.
6. The slices are placed in portions of several slices in a tub with a top under a control atmosphere whose $CO_2$ level is about 40%, the remainder being $N_2$. The combination of the tub and its top have a very limited permeability to oxygen.
7. The storage is at a temperature between 2 and 8° C. Under these conditions, the product is still edible 6 to 8 weeks after packaging.

During the whole of its marketing period, the product is characterized by a fine and white rind, by a melting soft texture and by the taste of a fresh camembert.

Example 2

Slice of Veined Cheese with a Moldy Rind with *Penicillium candidum*

A soft cheese was manufactured in the form of a log with rennet, lactic ferments, *Penicillium roqueforti* for the veined character and *Penicillium candidum*, using the process described in Example 1 and by applying the following variations:

After the brining of step 1: inoculation with *Penicillium roqueforti* by vertically piercing (lengthwise) the logs with needles in order to produce channels for growth of *Penicillium roqueforti* followed by surface inoculation by spraying *Penicillium* candidum. The milk is also inoculated with *Penicillium roqueforti*.

During the whole of its marketing period, the product is characterized by a fine and white rind, by a melting soft texture and by a fine taste of Blue.

Example 3

Slice of Fine Herb-Flavored Soft Cheese with a Moldy Rind with *Penicillium candidum*

The soft cheese was manufactured in the form of a log with rennet, lactic ferments, visible flavorings of fine herbs and *Penicillium candidum* according to the same process as in Example 1.

During the whole of its marketing period, the product is characterized by a fine and white rind, by a melting soft texture and by a fresh taste of fine herbs.

Example 4

Brie Triangle

The soft cheese was manufactured in Brie form (diameter between 140 and 400 mm, height 15 to 35 mm) with rennet, lactic ferments and *Penicillium candidum* according to the same process as in Example 1, by applying the following variations:

Step 5: Once the surface of the product is dry and cool, the Brie wheel is cut in the form of triangles.

During the whole of its marketing period, the product is characterized by a fine and white rind, by a melting soft texture and by a taste of young Brie.

Example 5

Method of Enumerating Molds

Medium: malt-agar extract
Typical composition:

| | |
|---|---|
| Malt extract | 30 g/l |
| Soybean tryptic peptone | 3 g/l |
| Agar | 15 g/l |

Preparation:
    48 g of medium are dissolved in 1 L of distilled water
    Heating in an autoclave at 100° C. for 40 minutes
    Filling 350 ml bottles
    Sterilization in an autoclave, 121° C., 15 minutes, 1.2 bar
    The pH of the agar at use must be 5.6+/−0.2
    To eliminate the growth of bacteria, the pH may be standardized with lactic acid at 4.5

Method of Enumeration:
    Derinding, that is to say removal of a fine layer of rind (1 mm thick)
    Dilution of 10 g of rind in 100 ml of sterile physiological saline
    Plating of the dilution and of lower dilutions on the gel medium in a Petri dish
    Incubation:
    96 hours at 25° C.
    Result:
    Counting of the mold colonies, the possible growth of yeasts is easy to distinguish by the size and the appearance of the colonies.

On the cheeses of the examples above, a number of spores ranging in value from 6.5 to 7 logarithmic units was measured before heat treatment in accordance with the process of the invention. After application of the controlled heat treatment process of the invention, the measurement of the number of spores ranged in value from 2.0 to 2.5 logarithmic units.

The invention claimed is:

1. A process for producing a cheese from milk, comprising the following steps:
    (i) preparing a cheese slurry from milk, either by renneting, or by gelling of the milk, and molding the cheese slurry;
    (ii) inoculating the molded cheese obtained in step (i) with microorganisms, at least one of which is a mold;
    (iii) ripening the cheese in step (ii); and
    (iv) subjecting the ripened cheese obtained at the end of step (iii) to a heat treatment; wherein said heat treatment comprises a step of immersing the ripened cheese in an atmosphere saturated with steam or in a water bath wherein said heat treatment is effected for about 10 seconds to 5 minutes in said steam or water bath at a temperature of about 60 to 100° C.;
wherein said cheese has characteristic features of:
    a) having in a rind a quantity of spores of molds measured in logarithmic unit of spores capable of forming colonies, of about 0.75 to 3.5 logarithmic units; and
    b) containing live lactic ferments.

2. The process of claim 1, wherein the milk is used as a starting material is cow's, goat's, sheep's or buffalo's milk.

3. The process of claim 1, wherein the cheese is camembert, brie, coulommiers, pont-l'Évêque, or saint nectaire or a combination thereof.

4. The process of claim 1, wherein the mold is selected from the group consisting of *Penicillium* and *Cylindrocarpon*.

5. The process of claim 4, wherein the mold is *Penicillium candidum*.

6. The process of claim 1, wherein the inoculating step (ii) further comprises adding one or more yeasts or lactic acid bacteria or both.

7. The process of claim 1, which further comprises prior to step (i) subjecting the milk to a pretreatment selected from the group consisting of ultrafiltration; heat treatment; and inoculation with *Penicillium candidum*.

8. The process of claim 1, wherein in step (i) the milk is subjected to renneting, whereby addition of rennet to the milk leads to the formation of a curd which is sliced, molded, drained.

9. The process of claim 1, wherein in step (i) the milk is thickened with the aid of one or more gelling materials.

10. The process of claim 1, wherein after the molding, the curd, or the gelled cheese slurry, is acidified, and then salted by soaking in a brine bath.

11. The process of claim 10, wherein the acidification is carried out such that the pH is between 3 and 5.5.

12. The process of claim 11, wherein the pH is less than or equal to 5.2.

13. The process of claim 12, wherein the pH is less than or equal to 5.1.

14. The process of claim 1, wherein the heat treatment comprises immersing in a water bath for a period of 40 to 80 seconds and advantageously of about 60 seconds.

15. The process of claim 1, wherein the heat treatment of step (iv) is carried out at a temperature ranging from 80 to 100° C.

16. The process of claim 15, wherein the heat treatment is carried at a temperature of from 85 to 95° C.

17. The process of claim 16, wherein the heat treatment is carried out at about 90° C.

18. The process of claim 1, wherein the cheese obtained in step (iv) is further subjected to a drying step.

19. The process of claim 1, wherein the drying is carried out at a temperature of −2 to 20° C., with a humidity of 50 to 90% humidity, for a period of 12 to 48 hours.

20. The process of claim 1, which further comprises a slicing step.

21. The process of claim 1, which further comprises a step of packaging under a gas in a packaging which acts as a barrier to oxygen.

22. The process of claim 21, wherein the gas comprises from 0 to 50% of carbon dioxide and from 50 to 100% of nitrogen.

23. The process of claim 21, wherein the packaging is a plastic tub with a top.

24. The process of claim 1, wherein said heat treatment is effected by infrared radiation.

25. The process of claim 1, which further comprises a step of slicing prior to a step of packaging.

26. The process of claim 25, which further comprises the step of storing the cheese in the fresh food department at a temperature of 2 to 6° C. for a period of 6 to 8 weeks.

* * * * *